H. T. GOSS & J. W. BRYCE.
TIME RECORDER.
APPLICATION FILED OCT. 10, 1912.
1,085,678.
Patented Feb. 3, 1914.
6 SHEETS—SHEET 4.
Fig. 4,
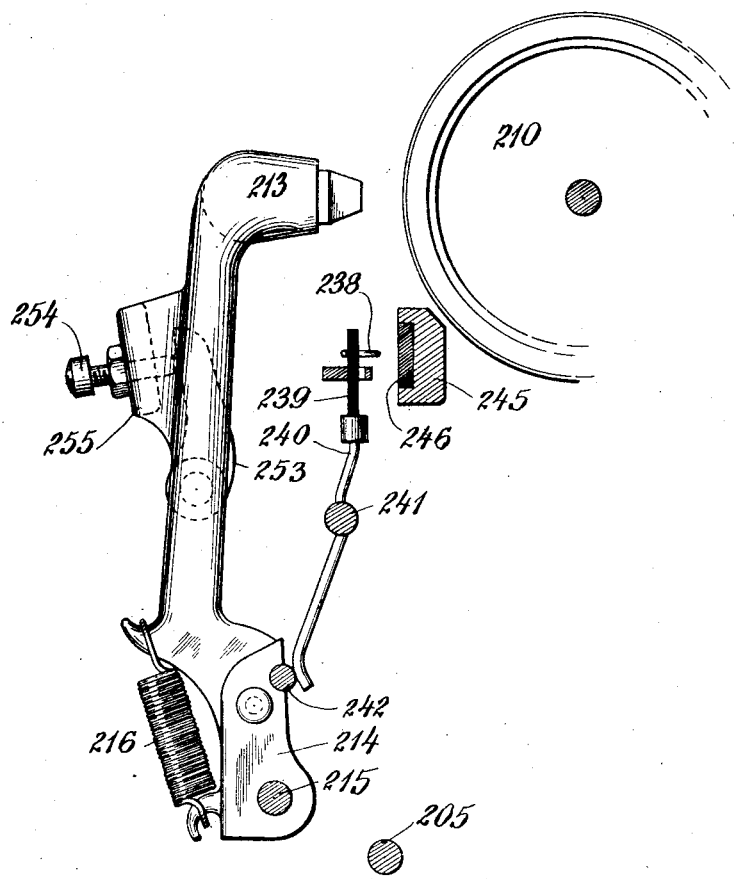
Fig. 5,
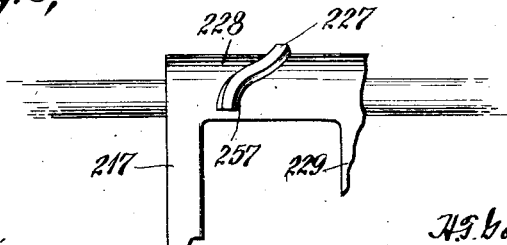
WITNESSES
L. Hauerstein
A. L. Dunham
INVENTORS
H. T. Goss and J. W. Bryce
BY
Kerr, Page, Cooper & Hayward
ATTORNEYS

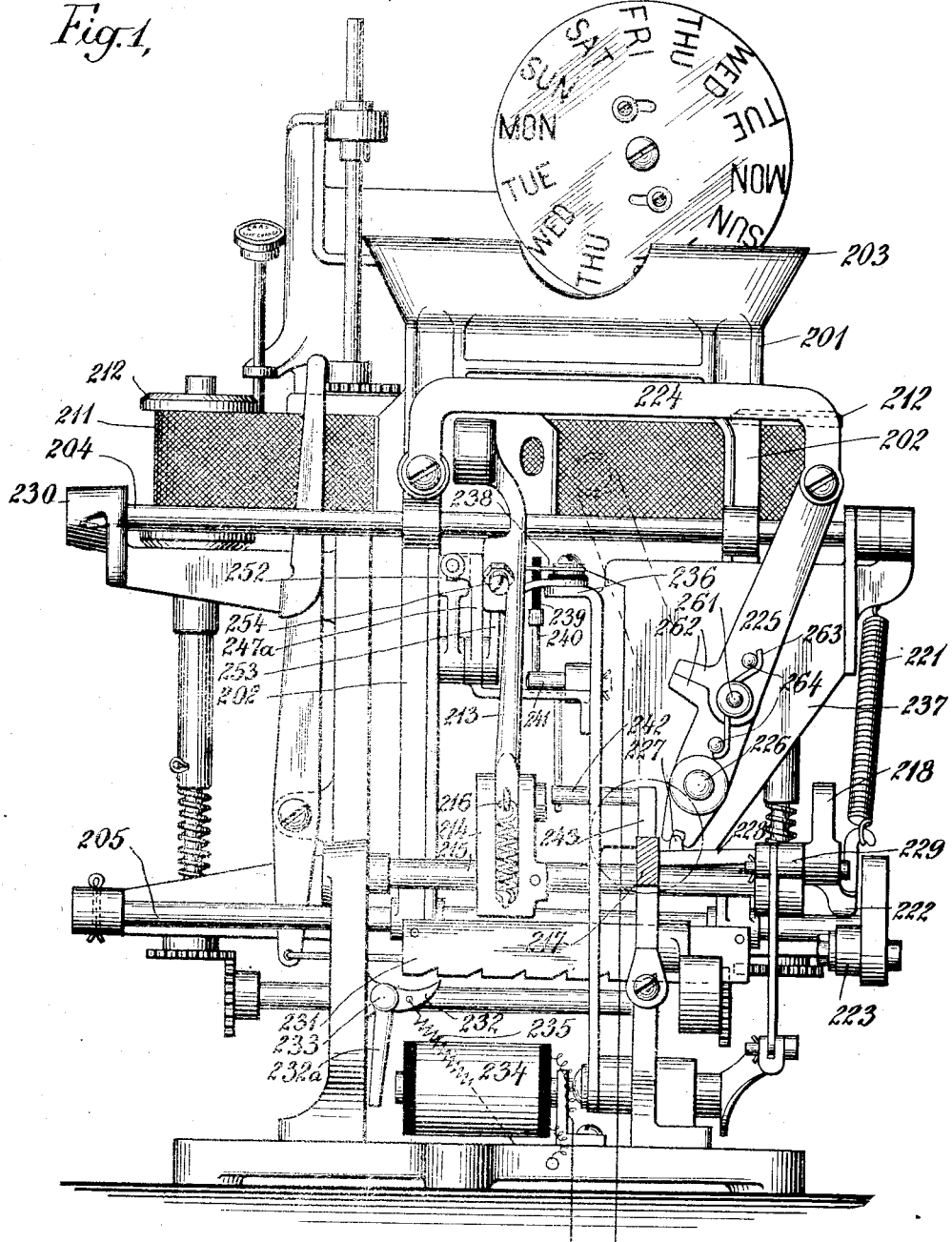

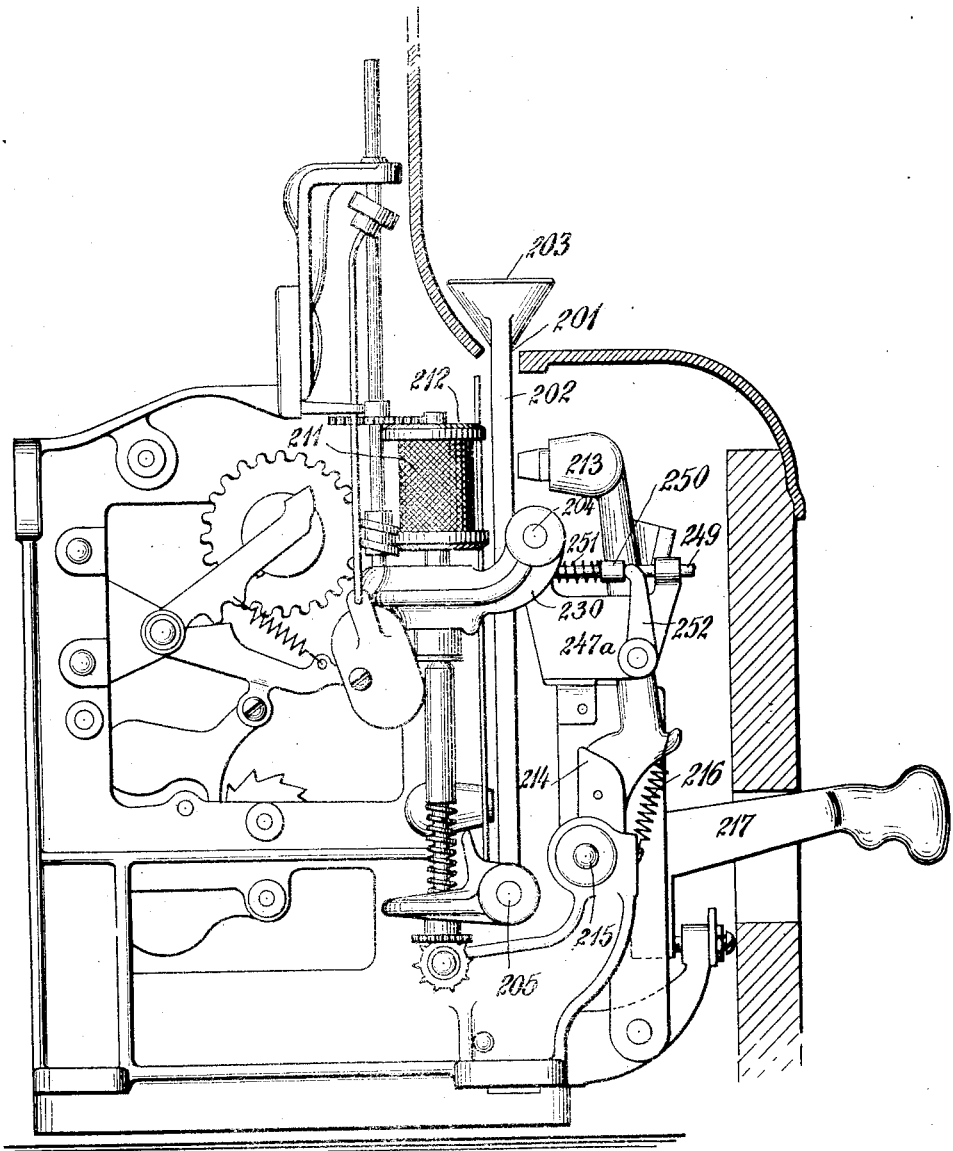

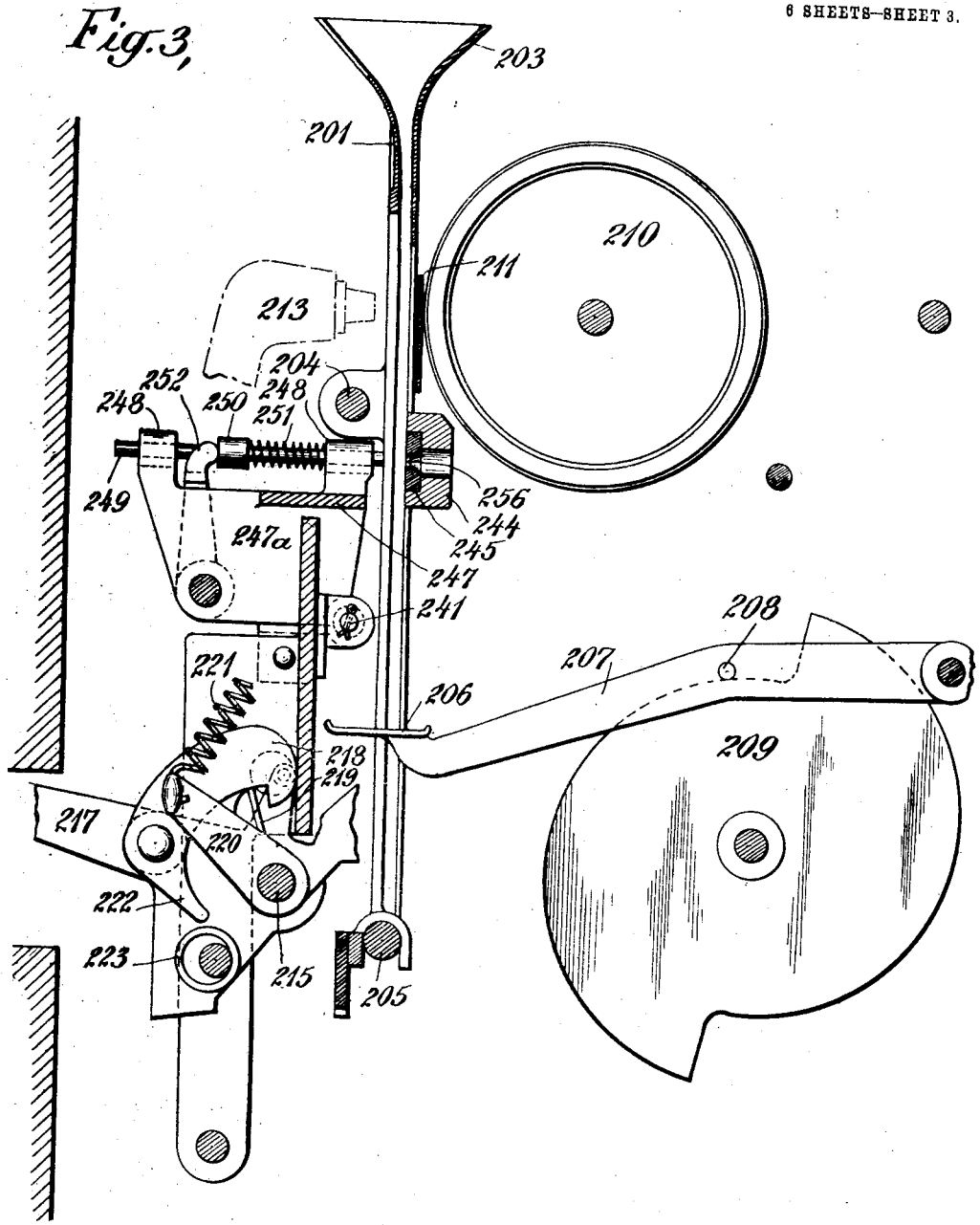

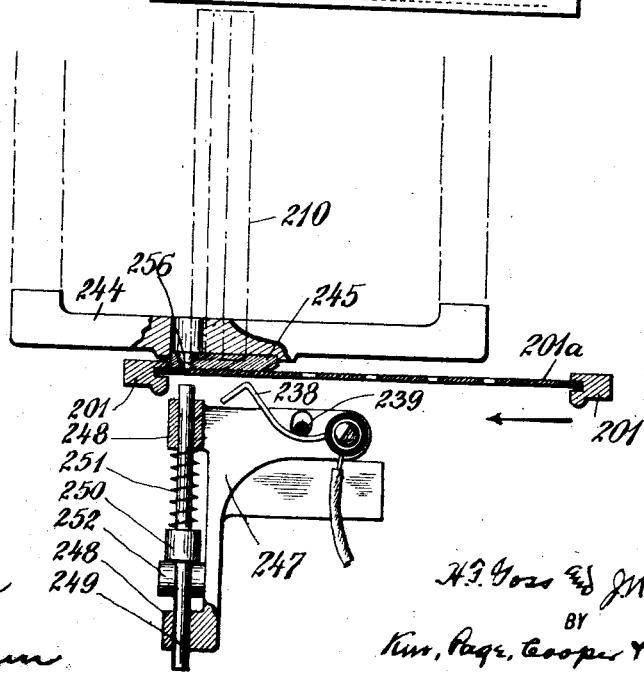

H. T. GOSS & J. W. BRYCE.
TIME RECORDER.
APPLICATION FILED OCT. 10, 1912.
1,085,678.
Patented Feb. 3, 1914.
6 SHEETS—SHEET 6.
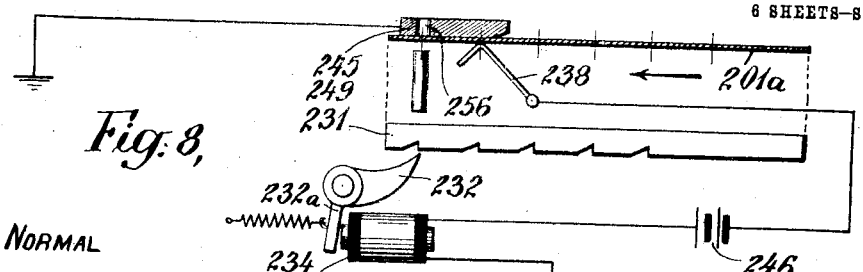
Fig. 8,
NORMAL
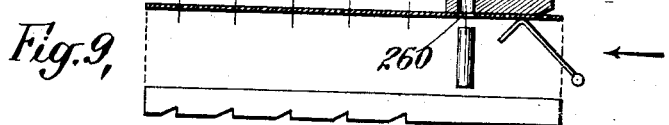
Fig. 9,
MORNING IN
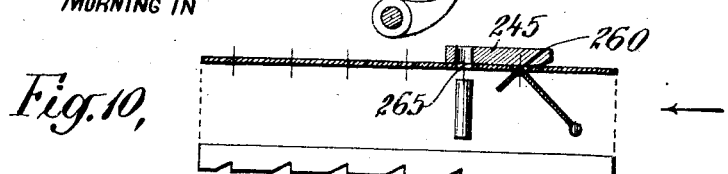
Fig. 10,
MORNING OUT
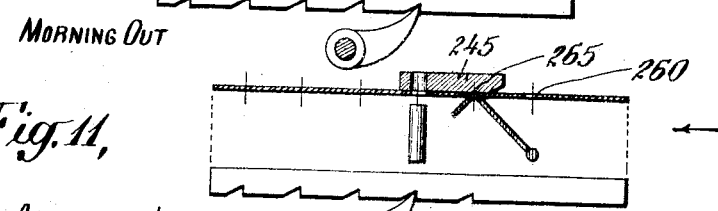
Fig. 11,
AFTERNOON IN
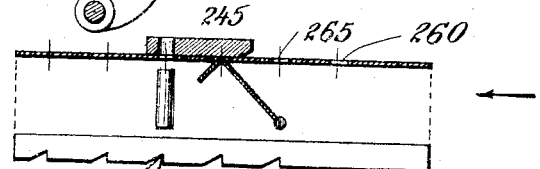
Fig. 12,
AFTERNOON OUT
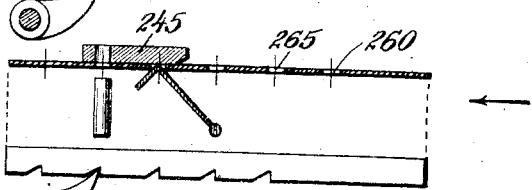
Fig. 13,
EXTRA IN
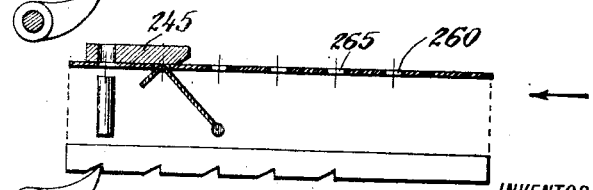
Fig. 14,
EXTRA OUT
WITNESSES
L. Hauerstein
A. H. Dunham
INVENTOR
H. T. Goss & J. W. Bryce
BY
Kerr, Page, Cooper & Hayward
ATTORNEYS

UNITED STATES PATENT OFFICE.

HARRY T. GOSS, OF RUTHERFORD, AND JAMES W. BRYCE, OF BLOOMFIELD, NEW JERSEY.

TIME-RECORDER.

1,085,678.

Specification of Letters Patent. Patented Feb. 3, 1914.

Original application filed June 19, 1912, Serial No. 704,504. Divided and this application filed October 10, 1912. Serial No. 724,929.

*To all whom it may concern:*

Be it known that we, HARRY T. GOSS and JAMES W. BRYCE, citizens of the United States, residing, respectively, at Rutherford, Bergen county, New Jersey, and Bloomfield, Essex county, New Jersey, have invented certain new and useful Improvements in Time-Recorders, of which the following is a full, clear, and exact description.

This application relates to time recorders, and is a division of our co-pending application Ser. No. 704,504, filed June 19, 1912.

In the time recorders employed to record the times of arrival and departure of workmen it is of course necessary that the record sheet or card, or the time-printing wheels, be shifted, one with respect to the other, at the proper instant to cause each record-imprint to be made on an unprinted space on the sheet. It has heretofore been proposed to produce this shifting movement by or under the control of the clock, the arrangement being such that the desired movement will occur at certain definite times during the day. Thus, for example, up to a certain hour, say 7:00 a. m., the imprints will all be made in the arrival or "morning-in" spaces. Then at 12:00 m. one of the elements of the printing couple is shifted, so that imprints made by the workmen going out for lunch will be made in the "noon out" spaces; subsequent adjustments of one element relative to the other providing for the "noon-in", "afternoon-out", "night-in", and "night-out" records.

Our present invention differs radically from this scheme, in that while we provide relative adjustment or shift of one of the printing elements to accomplish the "in" and "out" spacing, the adjustment is not effected by or under the control of the clock but occurs for each workman whenever he registers, no matter what the time of day may be. Thus, when a workman arrives in the morning his record is made in his morning-in space. The next time he registers, even if immediately after the first, the resulting imprint will be made in another space—usually considered the morning-out or noon-out space—and so on throughout the day. On the other hand another workman, who arrives after the second registration of a man who preceded him, will register in his morning-in space. In other words the adjustment is effected for the workmen separately and not collectively. This means that each time a registration is made the imprint is made on a fresh or unprinted space on the record sheet, and hence no previously printed record can be obliterated or rendered illegible by repeated operations of the machine.

While our invention is adaptable to time recorders of any type in which there is provision for relative adjustment or the elements of the printing couple to accomplish the in-and-out spacing, we have shown the invention herein as applied only to a recorder of a single type, to wit, the so-called "card" machine. In "card" machines as usually constructed each workman has his own record sheet or card, which is devoted exclusively to his own record and is usually in the form of a card with provision for one or two weeks' records.

One form of the invention as applied in the preferred manner to a time recorder of the type indicated, is illustrated in the accompanying drawings, in which—

Figure 1 is a front view of the recording mechanism of the time recorder, the particular machine illustrated being that described in the patent of Clinton E. Larrabee, No. 935,312, issued September 28, 1909, to which reference may be made for explanation of any parts shown in the figure but not mentioned in this specification. Fig. 2 is a detail view of the mechanism shown in Fig. 1, looking from the left. Fig. 3 is a detail vertical section showing the punching mechanism, the abutment or card-lift which rises at daily intervals to limit the depth to which the record cards of the different workmen can be inserted in the card chute or receiver. This figure also shows part of the mechanism which actuates the printing hammer. Fig. 4 is a detail side view partly in vertical section, showing the connection of the printing hammer with the electric contact mechanism to actuate the latter. Fig. 5 is a detail plan view of the cam member which serves to shift the card receiver for the purpose of effecting the in-and-out spacing. Fig. 6 is a detail sectional plan view of the punch mechanism and electrical contact devices. Fig. 7 shows a record card of the kind usually employed with a time recorder of the card type. Fig. 8 is a diagrammatic sectional view showing the normal or initial position of the record card, the punching mechanism, contact devices, and the electro-magnetically actuated mechanism for arresting the card receiver or chute in its in-and-out movement. Figs. 9, 10, 11, 12, 13 and 14 are diagrammatic views of the same parts, showing the same in the positions of, respectively, morning-in, morning-out, afternoon-in, afternoon-out, extra-in and extra-out.

As before stated, the record sheet in a card machine is preferably in the form of a stiff card, for example as shown in Fig. 7, having horizontal columns for the several days of the week and vertical columns for the in-and-out records. In the machine illustrated this card, when a registration is to be made, is inserted, with the face of the card toward the rear, into a vertical chute or card-receiver 201 in the form of an open framework composed of grooved side members 202 and a flaring top 203, the card fitting the receiver rather closely so as to have but little if any play therein. The receiver or record sheet support 201 is mounted to slide horizontally and transversely on upper and lower rails 204, 205, to move the card sidewise past the impression point, thus giving the in-and-out spacing, while the day-spacing is produced by varying the depth to which the card is inserted in the receiver. For the latter purpose the bottom of the chute is in the form of an abutment or card-lift 206 carried on the forward end of an arm or lever 207 pivoted at its rear end and having a pin 208 resting on a double cam 209. This cam is revolved by or under the control of the clock (not shown) at such a rate as to make one complete revolution in two weeks, and its movement is step-by-step so that at the proper instant 206 will be raised far enough to cause a new day line to stand at the impression point when the cards are again inserted in the receiver. The clock and the cam actuating mechanism are not illustrated herein but they are fully described in the prior patent of C. E. Larrabee, No. 771,494, to which reference may be made if it is desired to construct a machine of this type. Suffice it to say that the abutment 206, lever or arm 207, and cam 209 in the present embodiment constitute clock-driven or clock-controlled means for effecting the day-spacing. The printing wheels are indicated diagrammatically at 210, Figs. 3 and 4, and are also clock-driven or clock-controlled by suitable mechanism not shown herein but fully described in the Larrabee patent mentioned. The printing wheels are arranged behind the card receiver 201 near the top thereof and between the wheels and the receiver is an ink ribbon 211 mounted on spools 212. The printing hammer 213 is in front of the receiver, and when thrown rearward carries the card and ribbon smartly against the type wheels, thereby printing a time record on the card in a space thereon determined by the vertical and lateral adjustment of the card, as will be readily understood.

The vertical printing hammer 213 is pivoted at its lower end in a forked arm 214 fixed on a horizontal transverse shaft 215 and is held yieldingly in a forward position, well out of contact with the card in the receiver by a spring 216. Loose on the shaft 215 is a manual operating lever or handle 217 which the workman actuates to effect a registration, and pivoted on the lever or handle is a trip finger 218 arranged to engage a finger 219 rigidly mounted on shaft 215. Fast to the same shaft is an arm 220, connected by a spring 221 which urges the shaft in the clockwise direction (as viewed in Fig. 3) and hence tends to throw the hammer 213 toward the card receiver 201. From the foregoing it will be seen that on depressing the lever or handle 217 the pawl or hooked finger 218, engaging the finger 219, will advance the same, thereby rocking the shaft 215 and drawing back the hammer. As the lever is depressed the depending tail 222 of the finger 218 engages a cam-stop 223, with the result that the finger or pawl 218 is swung out of engagement with the finger 219, whereupon the spring with the finger 221 instantly rocks the shaft 215, bringing the hammer to the position shown in Figs. 3 and 4. The hammer being of suitable weight, its momentum is sufficient to carry it beyond this point against the tension of the spring 216 and cause it to strike a sharp blow upon the card, ink ribbon, and type wheels. The blow having been struck and a time imprint thereby made on the card, the hammer is instantly restored to normal position by the spring 216.

To provide for the in-and-out spacing the card receiver or record sheet supporting device is, as previously stated, adjustable past the impression point. Pivoted by one end to one side of the receiver near the top thereof is a link 224 in the form of a broad, inverted U, pivoted at its other end to a lever 225 fulcrumed at 226 and engaging with its notched lower end a cam rib 227 (Fig. 5) on a cam member 228 parallel with the shaft 215 and rigidly connected at its ends to the printing lever 217 and an arm 229 on the same shaft. Consequently, as the printing lever is depressed the cam rib 227 will swing the lever 225 counterclockwise (as viewed in Fig. 1), thereby sliding the card receiver 201 leftward on the rails 204, 205. The leftward movement of the receiver is limited by the stop 230, in which the top rail 204 is mounted, and when the receiver is in this extreme leftward position the morning-in column on the record sheet or card is opposite the type wheels, that is, at the impression point. To arrest the receiver at other points in its path, successively nearer to the initial or extreme rightward position of the receiver, the lower portion of the receiver is fitted with a downwardly disposed rack 231, having five teeth adapted to coöperate with a pawl 232 pivoted at 233 and having a depending arm 232ª constituting the armature of an electromagnet 234. The pawl is normally held out of the path of the rack by a light spring 235, but when the magnet is energized the pawl is swung up against the rack and by engagement with a tooth on the rack arrests or holds the receiver; the point at which the receiver is arrested or held depends of course on the particular tooth engaged, which in turn depends upon the time at which the pawl is actuated.

On a lug 236, formed on the plate 237 on which the receiver-shifting lever 225 is fulcrumed, is a spring contact or brush 238, tending constantly to press against the record card in the receiver but normally held away from the plane of the card by a non-conducting finger 239 mounted on a lever 240 fulcrumed at 241, on the plate 237. The lower arm of this lever coöperates with a leftwardly extending stop or finger 242 carried by a short standard or arm 243 extending upwardly from the printing handle 217 so that when the handle is in its normal or elevated position the finger 239 will hold the spring contact or brush 238 away from the plane of the record sheet. When, however, the printing handle is depressed to make an imprint on the record card the simultaneous forward movement of the stop 242 permits the lower end of lever 240 to follow and hence allows the contact 238 to swing rearwardly against the record card, as will be readily understood.

The contact 238, as will be noted, is below the ink ribbon 211, and in horizontal alinement with the contact but in rear of the record card in the receiver is a support 244 in which is secured a second contact in the form of a metal plate 245. The two contacts, the magnet 234, and a source of current, indicated at 246, being in series, it will be apparent that if, when the contact 238 is released it finds an opening in the record card (a card in position in the receiver is shown at 201ª in Fig. 6) it will strike the contact 245 through the card and so close the magnet circuit, whereupon the magnet is energized and the armature 232ª actuated. This swings the pawl 232 up against the rack 231 and arrests or holds the card receiver, as previously described.

For the purpose of providing suitable holes in the record card at proper distances apart to cause the arrest of the card receiver 201 with the appropriate in-and-out columns at the impression point the following devices are provided: The lug 236 supports a depending bracket 247 carrying a vertical plate 247ª provided at its top with forwardly and rearwardly alined lugs 248 in which is slidably mounted a stem 249 constituting the male member of a punching mechanism. This punch 249 has a collar or stop 250, and between said collar and the rear lug 248 the punch is encircled by an expansion coil spring 251 which serves to urge the punch toward the front of the machine. On its front face the collar 250 is engaged by the forked upper end of an arm 252 fixed on a short shaft or pivot mounted in the lower portion of the plate 247ª, said arm being on the left side of the plate as viewed in Fig. 1. On the opposite side of the plate is an arm 253, also fixed to said pivot or shaft, having its upper end in the path of an adjustable stop 254 (Fig. 4) in a lug 255 on the side of the printing hammer 213. It will therefore be seen that as the hammer 213 swings forward to make an imprint on the record sheet or card the stop 254 will engage and swing the arm 253 forward, thereby rocking the shaft to which the arm is fixed and causing the arm 252 to actuate the punch 249 through the instrumentality of the collar 250 with which said arm 252 engages. In exact alinement with the punch 249 the contact 245 is provided with an aperture 256, thus making the part 245 serve not only as a contact but also as the female member of the punching mechanism.

From the foregoing it will be seen that as the printing hammer moves toward the rear of the machine to make the imprint on the record card in the receiver the stop 254 will swing the arm 252 in the same direction, thereby actuating the stem 249 and punching a hole in the record card. It will also be seen that the punching mechanism is actuated each time an imprint is made on the record card, regardless if the card is in its lowermost or uppermost or any intermediate position in the receiver.

By referring to Fig. 5 it will be seen that the cam rib 227, which serves to clutch the lever 225 and thus shift the card receiver 201 horizontally past the impression point, has a slight dwell 257 at its forward end. The result of this construction is that for an instant after the handle 217 begins to move downwardly to operate the recorder the lever 225 is not actuated and the card receiver does not move. Nevertheless the stem 243, carried by the printing handle, moves forwardly with the handle and permits the contact 238 to impinge on the record card. As the downward movement of the handle continues the receiver 201 starts, rubbing against the contacts 238 and 246 and thereby keeping the same clean and bright. As soon as a hole in the card comes under the contact 238 the latter strikes through and against the contact 246, thereby closing the circuit of the magnet 234 and causing the receiver 201 to be arrested.

Referring now to Figs. 8 to 14 inclusive, which illustrate the operation diagrammatically, Fig. 8 shows the parts in the normal or initial position, with the receiver 201 at the extreme right of its path as viewed from the front of the machine. When a workman, arriving in the morning of the first working day of the week depresses the lever or handle to make his morning-in record, the first effect is to throw the contact 238 against the record card. The card receiver then moves toward the left, and inasmuch as the card has no holes in the horizontal line moving past the contact the receiver shifts to its extreme leftward position, shown in Fig. 9, bringing the morning-in column opposite the impression point and the punch. As the printing hammer strikes the card, carrying the same against the ink ribbon and the time-printing wheels, the punch 249 is actuated, punching a hole 260 in the card 201ᵃ. Upon the release of the printing lever the spring 221 (Fig. 1) restores the parts to normal position. The next time the same workman registers, the contact is thrown against the card as before and the receiver moves toward the left, but as it approaches the morning-out position the hole 260 comes into register with the tip of the contact 238, whereupon the latter strikes through the hole and against the second contact 245, closing the circuit of magnet 234 which then actuates the pawl 232 and arrests the receiver, with the morning-out column opposite the printing point and the punch 249. The printing handle must, however, continue to move downwardly to complete the recording operation, and to permit such continued movement the lever 225, which, it will be remembered, shifts the card receiver, is divided into two parts pivoted together at 261, the parts being formed with lugs 262 which abut when the parts are in alinement. Encircling the forwardly extended end of the pivot is a coil spring 263 connected by its ends to the studs 264 on the lever parts. Now when the receiver is arrested by the pawl 232 the printing lever can continue its downward movement, the lever 225 simply buckling at the joint 261 against the tension of the spring 263, which latter restores the lever parts to alinement or normal position as, or as soon as, the force exerted by the cam rib 227 ceases to act. It will thus be seen that at the morning-in position a record is printed and at the same time a hole 265 is punched in the card, which serves to arrest the receiver at the afternoon-in position at the next registration by the same workman. Similarly, at each succeeding registration a hole is punched, making six in all for the particular day if the employee comes in at night or for overtime, the six positions of his card, for morning-in, morning-out, afternoon-out, extra-in, and extra-out, being shown in Figs. 9 to 14, respectively. Before the beginning of the next day's work the abutment or card-lift 206 is raised, so that at the next insertion of the card it will not sink to the same depth as on the first day, but will drop just far enough to bring the day-lines for the second day for example Tuesday, opposite the impression point and the contact 238. At the end of the week the card will look something like that shown in Fig. 7, with a hole for each and every time-imprint, the several imprints and the corresponding holes having determined positions with respect to each other. Thus hole 260 corresponds to the Monday morning-in imprint, hole 265 corresponds to the Monday morning-out imprint, and hole 266 to the Friday afternoon-in record. The teeth on the member 231 are preferably slightly undercut, so that the force tending to move the card chute will hold the member in engagement with the pawl 232, after the circuit is broken, until the printing handle is released.

From the foregoing it will be seen that although in these present machines the record sheet which bears the holes has to be renewed periodically, such sheet is nevertheless an operative element of the machine, since without the sheet or an equivalent the record-sheet support cannot be shifted. This results from the fact that when the card or sheet is omitted there is nothing to prevent closing of the contacts, with the record-sheet support in normal or initial position, whenever the printing handle is actuated. Again, the machine manufactures its own controlling devices, so to speak, by punching the holes in proper relation to the portions of the time record sheet which are to receive the imprints, and does not "set up" one or another of a series of devices which are individual to the respective workmen. The devices which directly coöperate to arrest or hold the record sheet support at the proper points in its path are never left set up or arranged for a succeeding registration but are always restored to an initial or normal position and are actuated prior to the next registration by an external source of power (in the present instance electric power) instead of by the force exerted by the workman in operating the machine. These principles are characteristic of our invention, but it is not essential that they all be employed, as the question whether one or another or all are to be utilized depends for its answer largely upon the specific design of the machine to which the invention is to be applied and the specific manner in which the invention is to be incorporated therein.

What we claim is:

1. In a time recorder, the combination with a record sheet support, a record sheet carried thereby, and time printing devices for printing time records on the record sheet; of means for moving the support relatively to the time printing devices to provide the in-and-out spacing of the time records; and mechanism under the control of the record sheet to arrest the record sheet support.

2. In a time recorder, the combination with a record sheet support, a record sheet carried thereby, and time printing devices for printing time records on the record sheet; of means for moving the support relatively to the time printing devices to provide the in-and-out spacing of the time records; mechanism for arresting the support; and controlling devices coöperating with the record sheet to control the operation of the arresting mechanism.

3. In a time recorder, the combination with a record sheet support, a record sheet carried thereby, and time printing devices for printing time records on the record sheet; of means for moving the record sheet support relatively to the time printing devices to provide the in-and-out spacing of the time records; a controlling device adapted to bear on the record sheet; mechanism, dependent for operation upon movement of the controlling device through the record sheet, to arrest the said support; and mechanism for perforating the record sheet while the support is arrested.

4. In a time recorder, the combination of a record sheet; manual means for moving the same relatively to the impression point to provide the spacing of the time records; contacts on opposite sides of the record sheet and normally separated thereby; mechanism for arresting the support; an actuating electromagnet for said mechanism, in circuit with the contacts; and mechanism actuated by said manual means to perforate the record sheet while the same is arrested, whereby at a succeeding movement of the support the contacts may coöperate through a perforation with consequent actuation of the arresting mechanism.

5. In a time recorder, the combination of a record sheet support; a record sheet carried thereby; means for moving the support from an initial position and past a given point to provide the spacing of the time records; contacts adapted to bear on opposite sides of the record sheet; mechanism for perforating the record sheet, arranged adjacent to the contacts and alined therewith in the direction of movement of said support; a rack carried by the support; a pawl adapted to engage the rack to arrest the record sheet support; an electromagnet to actuate the pawl, energizable by coöperation of the contacts through a perforation in the record sheet; and means for actuating the perforating mechanism while the record sheet support is arrested.

6. In a time recorder, the combination of a record card receiver; a record card carried thereby; manual means for moving the receiver in the plane of the card to provide the in-and-out spacing of the time records; and mechanism under the control of the record card to arrest the receiver.

7. In a time recorder, the combination of a record card receiver; a record card carried thereby; manual means for moving the receiver in the plane of the card and from an initial position; electromagnetically actuated mechanism to arrest the receiver at successive points in its path; means coöperating with the record sheet to control the arresting mechanism; and means for restoring the receiver to initial position after actuation of said manual means.

8. In a time recorder, in combination, a record card support, a record card carried thereby, time printing devices, means for imprinting time records from said devices upon the record card, said means being adapted to move the record support relatively to the impression to provide an in-and-out spacing of the time records, and mechanism under control of the record card to arrest the record support.

9. In a time recorder, in combination, a record sheet support, a record sheet, manually operated means for moving the same relative to the impression point, said means being adapted to impress time records on the record sheet, means for perforating the record sheet, contacts arranged in alinement with the perforations so produced and adapted to close an electric circuit when a perforation passes between the contacts, an electromagnet in circuit with the contacts and mechanism operated by the electromagnet for arresting the record sheet support, whereby in-and-out spacing of the time records is produced.

10. In a time recorder, the combination of a record card receiver, a record card carried thereby, manual means for moving the receiver in the plane of the card to provide the in-and-out spacing of time records, mechanism under the control of the record card to arrest the receiver, and resilient means to return the receiver to initial position upon completion of a recording operation.

11. In a time recorder, in combination, a record sheet support, a record sheet, a manually operated platen for producing time records on the record sheet, means for moving the record sheet support, means for perforating the record sheet, an electric circuit having contacts adapted to coöperate through perforations in the record sheet and close the circuit, means normally holding one of said contacts out of contact with the record sheet and operable upon the movement of the platen to allow the contact to engage the record sheet, and electromagnetic means operable by the closing of the circuit for arresting the movement of the support.

12. In a time recorder, in combination, a record sheet support, a record sheet, manually operated impression means including a printing hammer, means actuated by the printing hammer for perforating the record sheet, an electric circuit having contact devices arranged on opposite sides of the record sheet, said devices adapted to coöperate and close the circuit when a perforation in the card comes between them, mechanism for moving the record sheet support, and means controlled by closing of the electric circuit to arrest the card support.

13. In a time recorder, in combination, a record sheet support movable vertically and laterally past the impression point, a record sheet carried by the support, time controlled means for moving the record sheet support intermittently past the impression point in one direction to provide the day spacing of the time records, manually actuated means for moving the said support in the other direction past the impression point to effect the in-and-out spacing of the time records, mechanism for perforating the record sheet at each time-recording operation, and electromagnetic mechanism, controlled by the perforations in the record sheet, to arrest the record sheet support in its in-and-out spacing movement.

14. In a time recorder, in combination, a record sheet support, a record sheet, manually operated means for impressing time records on the record sheet, mechanism associated with the aforesaid means for moving the record sheet support, means for perforating the record sheet, and mechanism dependent for its operation upon the perforations in the record sheet for arresting the movement of the record sheet support.

15. In a time recorder, in combination, a record card, a record card support, a manually operable platen for impressing time records upon the card, mechanism operable by the platen for moving the record card support, mechanism under the control of the record card for arresting the card support, and means permitting a full movement of the platen upon the arresting of said card support.

16. In a time recorder, in combination, a record card receiver, a record card carried thereby, manual means for producing time imprints on the record card, mechanism operable by the aforesaid means for moving the receiver in the plane of the card, mechanism under the control of the record card for arresting the receiver and a resilient connection between the time-imprint devices and the receiver-operating devices whereby a full movement of the time imprint devices may be had upon the arresting of the receiver.

17. In a time recorder, in combination, a record sheet support movable past the impression point, a record sheet carried by the said support, a contact plate on one side of the record sheet, a contact spring on the other side of the record sheet, a perforating die adapted to coöperate with the contact plate to perforate the record sheet, a manually operated platen for printing the time-records on the record sheet and associated with the said perforating die to actuate the same, an electric circuit, connected with the aforesaid contact plate and contact spring, to be closed by the spring touching the plate through a perforation in the record sheet, and means dependent upon the closing of said circuit for arresting the record sheet support.

In testimony whereof we affix our signatures in the presence of two subscribing witnesses.

HARRY T. GOSS.
JAMES W. BRYCE.

Witnesses:
M. LAWSON DYER,
S. S. DUNHAM.

---

Copies of this patent may be obtained for five cents each, by addressing the "Commissioner of Patents, Washington, D. C."